(12) United States Patent
Genna et al.

(10) Patent No.: US 8,504,326 B2
(45) Date of Patent: Aug. 6, 2013

(54) MULTILEVEL TIMESTAMP DETECTION CIRCUIT AND METHOD

(75) Inventors: Giovanni Genna, Zurich (CH);
Aleksandar Zhelyazkov, Zurich (CH);
Markus Hintermann, Stallikon (CH)

(73) Assignee: NXP B.V., Eindhoven (NL)

( * ) Notice: Subject to any disclaimer, the term of this patent is extended or adjusted under 35 U.S.C. 154(b) by 264 days.

(21) Appl. No.: 12/679,911

(22) PCT Filed: Oct. 1, 2008

(86) PCT No.: PCT/IB2008/054007
§ 371 (c)(1),
(2), (4) Date: Mar. 25, 2010

(87) PCT Pub. No.: WO2009/044355
PCT Pub. Date: Apr. 9, 2009

(65) Prior Publication Data
US 2010/0198558 A1      Aug. 5, 2010

Related U.S. Application Data

(60) Provisional application No. 60/976,834, filed on Oct. 2, 2007.

(51) Int. Cl.
*G06F 21/06* (2006.01)
*G06F 11/30* (2006.01)
*H02B 1/06* (2006.01)

(52) U.S. Cl.
USPC ........... 702/185; 702/187; 324/110; 713/178; 361/672

(58) Field of Classification Search
USPC ................. 702/187, 185; 713/178; 361/672; 324/110
See application file for complete search history.

(56) References Cited

U.S. PATENT DOCUMENTS

| 5,378,946 A | * | 1/1995 | Reime ............................. 327/14 |
| 6,233,339 B1 | | 5/2001 | Kawano et al. |
| 6,289,238 B1 | | 9/2001 | Besson et al. |

(Continued)

FOREIGN PATENT DOCUMENTS

| EP | 0969346 A2 | * | 6/1999 |
| EP | 0969346 A | | 1/2000 |

(Continued)

OTHER PUBLICATIONS

"Apex LX-800", APEX computer case internet product literature, captured from a Sep. 17, 2006 listing: http://web.archive.org/web/20060917030234/http://www.apextechusa.com/products.asp?pID=99.*

(Continued)

*Primary Examiner* — Sujoy Kundu
*Assistant Examiner* — Regis Betsch

(57) ABSTRACT

Disclosed are methods and circuits for detecting and recording timestamps for multiple events (222/322, 224/324) using a single input pin (252, 352) on a real time clock (RTC) (250, 350). Signals associated with each of the events are modulated to create a multiple level composite signal (240). The RTC includes a multiple signal level detection circuit to distinguish from among the various signal levels so that each event can be separately flagged and timestamped. For example, the opening of two or more covers (112, 114) on the housing (110) of an electronic device (100) can be monitored, distinguished, and separately flagged using a single RTC input port.

23 Claims, 3 Drawing Sheets

U.S. PATENT DOCUMENTS

| | | | |
|---|---|---|---|
| 6,577,984 B1 * | 6/2003 | Clairet et al. ............. | 702/151 |
| 6,993,656 B1 | 1/2006 | Peyravian et al. | |
| 2004/0222702 A1 * | 11/2004 | Yin ............................ | 307/134 |
| 2008/0001594 A1 * | 1/2008 | Youssef ..................... | 324/110 |

FOREIGN PATENT DOCUMENTS

| | | |
|---|---|---|
| EP | 1624361 A2 | 2/2006 |
| FR | 2757628 A | 6/1998 |
| WO | 92/12485 A1 | 7/1992 |
| WO | 2004/112221 A1 | 12/2004 |

OTHER PUBLICATIONS

"NZXT Lexa Mid-Tower Computer Case Review", dated May 12, 2006, Overclockers Club online review http://www.overclockersclub.com/reviews/nzxtlexa/4.htm.*

International Search Report for International Patent Application PCT/IB2008/054007 (Apr. 15, 2009), published as WO 2009/044355A3.

* cited by examiner

MULTILEVEL TIMESTAMP DETECTION CIRCUIT AND METHOD

The present disclosure generally relates to circuits and methods that detect and report physical events.

Timestamping can be an important security tool for authentication and critical event flagging. For example, it can be desirable to monitor for physical events indicative of tampering with electronic equipment so that such events can be detected and recorded.

Various aspects of the present disclosure involve using a single input to a multiple level detection circuit on a Real Time Clock (RTC) to distinguish from among more than one event so each event can be separately flagged and timestamp-recorded. The present disclosure is exemplified in a number of implementations and applications, some of which are summarized below.

In one aspect, the present disclosure provides multiple-event detection circuits that include a RTC integrated-circuit chip with an input port to receive an input signal indicative of an event and with a multiple input-level detection circuit, first-event and second-event switches, and an interface circuit to couple a first-event signal from the first-event switch to the input port and to couple a second-event signal from the second-event switch to the input port. The multiple input-level detection circuit distinguishes the first-event signal from the second-event signal, and the RTC integrated-circuit chip records a first timestamp for and in response to the first-event signal and records a second timestamp for and in response to the second-event signal.

In another aspect, the present disclosure provides multiple-event detection circuits that include a RTC integrated-circuit chip with an input port to receive an input signal indicative of an event and with a multiple input-level detection circuit, means for providing a first-event signal upon occurrence of a first event, means for providing a second-event signal upon occurrence of a second event, and means for coupling the first-event signal and the second-event signal to an input port of the RTC integrated-circuit chip. The RTC integrated-circuit chip can include means for providing distinguishing the first-event signal from the second-event signal and means for recording a first timestamp for and in response to the first-event signal and to record a second timestamp for and in response to the second-event signal.

The present disclosure also provides methods for distinguishing and timestamping multiple events, including steps of modulating a first-event signal indicative of a first-event relative to a second-event signal indicative of a second-event, coupling the first-event signal and second-event signal into an input port of a RTC integrated-circuit chip that includes a multiple input-level detection circuit, distinguishing the first-event signal from the second-event signal using the multiple input-level detection circuit, and recording a first timestamp for and in response to the first-event signal and a second timestamp for and in response to the second-event signal.

The present disclosure further provides for electronic devices that include a housing having a first cover and a second cover, and a tamper-event detection circuit. The tamper-event detection circuit includes a first tamper-event switch associated with the first cover to produce a first tamper-signal indicative of tampering with the first cover, a second tamper-event switch associated with the second cover and to produce a second tamper-signal indicative of tampering with the second cover, a RTC integrated-circuit chip having an input port coupled to a multiple input-level detection circuit, and an interface circuit to couple the first tamper-signal and the second tamper-signal to the input port. The multiple input-level detection circuit distinguishes the first tamper-signal from the second tamper-signal, and the RTC integrated-circuit chip records a first timestamp for and in response to the first tamper-signal and to record a second timestamp for and in response to the second tamper-signal.

The present disclosure also provides for multiple-event tamper detection circuits that include a RTC integrated-circuit chip with an input port to receive an input signal indicative of a tamper-event and with a multiple input-level detection circuit, a first tamper-event switch configured to produce a first tamper-signal indicative of a first tamper-event state, a second tamper-event switch configured to produce a second tamper-signal indicative of a second tamper-event state, and an interface circuit directly coupling the first tamper-event switch to the input port, and coupling the second tamper-event switch to the input port through a resistor. The multiple input-level detection circuit includes a first comparator biased to detect the first tamper-event state and the second tamper-event state, and a second comparator biased to detect only the first tamper-event state.

The above summary is not intended to describe each embodiment or every implementation of the present disclosure. The figures and detailed description that follow more particularly exemplify various embodiments.

The invention may be more completely understood in consideration of the following detailed description of various embodiments in connection with the accompanying drawings, in which.

Figure 1:
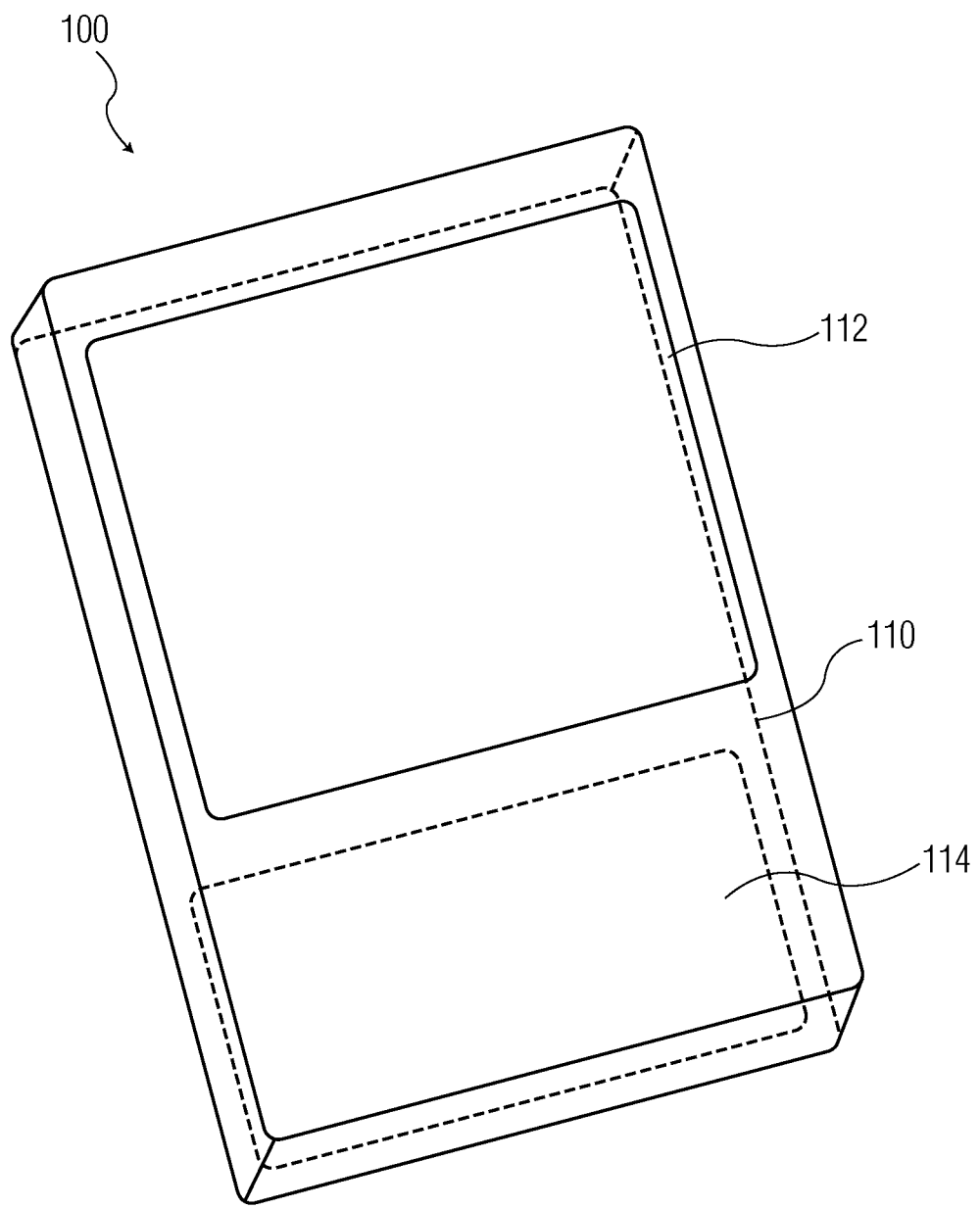
FIG. 1 shows a generalized electronic device that may utilize multilevel timestamp detection in accordance with the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of circuits and approaches involving and/or benefiting from the ability to timestamp multiple events using a single input pin of a RTC. For example, in an electronic device (e.g., computer or other CPU-based device, mobile or handheld device such as a cell phone, media player or PDA, and the like), it may be desirable to monitor for multiple different critical events such as attempts to tamper with the device by accessing one or more housing covers.

In cover-tamper detection implementations, a timestamp input detector of a RTC circuit can be used to monitor the voltage at the timestamp input pin, and when a negative edge is detected, the current date and time can be stored in some internal registers, a time stamp flag can be set and an interrupt on the interrupt pin (if it exists) can be generated. If multiple timestamp detections are desired, it is customary to implement using multiple timestamp input pins, one for each event to be monitored. The present disclosure provides circuits and methods to distinguish and separately timestamp different events using a single RTC input. The ability to monitor and distinguish signals indicative of different events using a single input of a RTC can provide significant advantages, including reducing the number of dedicated connections to the RTC. Given the high demands for circuitry "real estate", the ability to monitor, detect and record multiple events using a single input can provide distinct advantages.

While the present invention is not necessarily limited to such applications, an appreciation of various aspects of the invention can be gained through a discussion of non-limiting examples in such an environment.

FIG. 1 shows a generalized electronic device 100 that includes a housing 110 having a first cover 112 and a second cover 114. For example, cover 114 might house a battery compartment, maintenance circuitry, or other circuitry or components, particularly those for which it may be desirable to record timestamps when attempts have been made to access them through cover 114. As another example, cover 112 can be a device such as an electronic display, touch input pad, or other device that, while being a functional device, also serves to cover circuitry and components of the electronic device 100 in which it is housed.

Some applications where it can be important to monitor for tampering attempts include mobile devices that communicate with a network using proprietary and protected protocols, public access devices such as automated teller machines, information kiosks, vending machines (e.g., train and bus ticketing, food) or gaming and entertainment machines, keyless entry systems, utility meters (e.g., for electricity, gas, water, oil, etc.), public phones, and any other application where unauthorized access can compromise the integrity of the system.

Circuits and methods of the present disclosure allow detection of multiple tamper-event signals (for example) using the same RTC input pin by modulating the tamper-event signals relative to one another so that multiple-level detection circuitry within the RTC can distinguish from among the individual tamper-event signals. Thus, separate event flags can be set, separate timestamps can be recorded, and separate actions can be taken (if desired).

Figure 2:
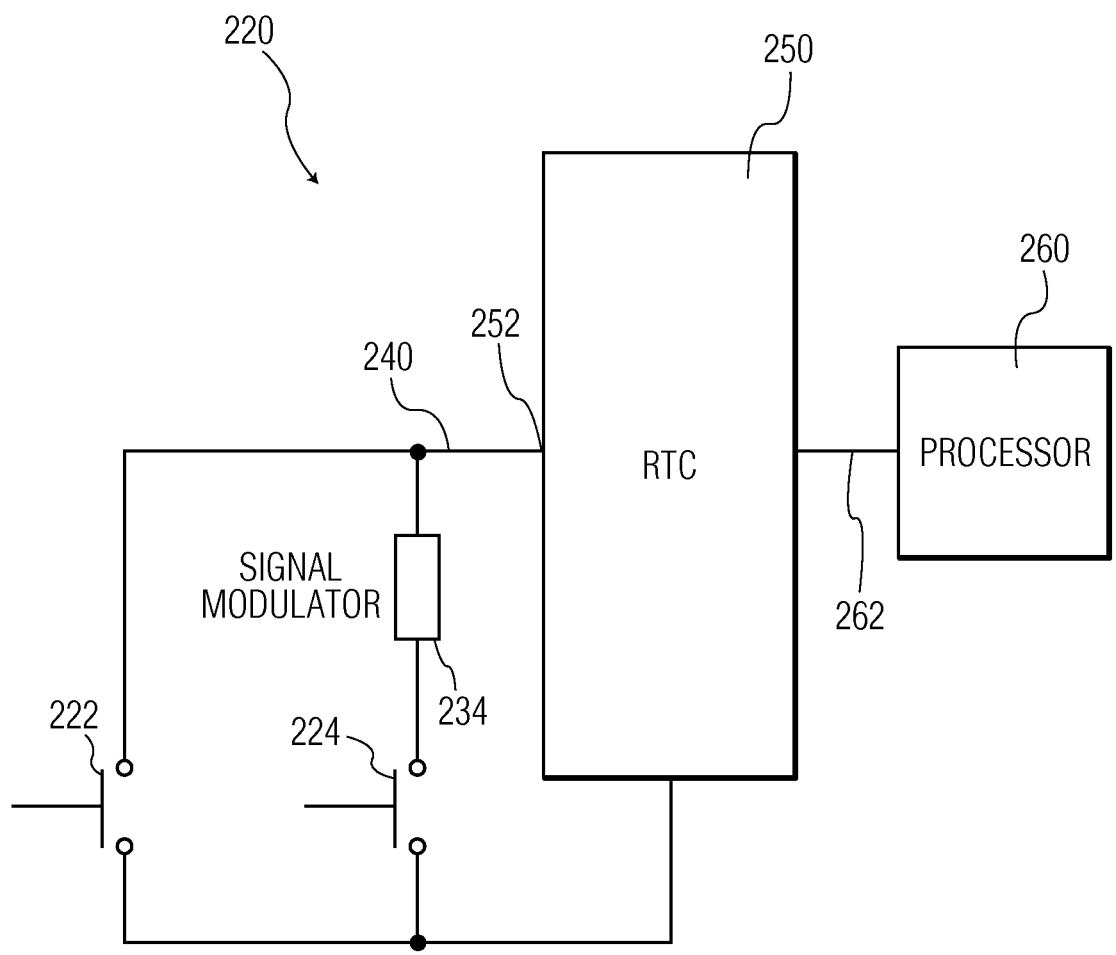
FIG. 2 is a generalized diagram of a circuit including multilevel timestamp detection in accordance with the present disclosure.

FIG. 2 shows an embodiment of a multiple tamper-event timestamp detection circuit of the present disclosure. Circuit 220 includes a first tamper-event switch 222 and second tamper-event switch 224 arranged in parallel. Switches 222 and 224 are shown as push-buttons for the sake of simplicity, although any switch suitable for the particular application can be used. The signal from tamper-event switch 224 is modulated by a signal modulator 234, which can be internal to the switch 234 or an external component such as a resistor, capacitor, or the like. In a similar manner, the signal from tamper-event switch 222 can optionally be modulated as well, although it can be sufficient to modulate just one signal. The signal modulator 234 modulates the signal corresponding to tamper-event switch 224 in such a way that multiple distinguishable signal levels are integrated into one signal 240 that connects to RTC 250 via input port 252. RTC 250 includes multiple-level detection circuitry (not detailed in FIG. 2) that distinguishes the signal levels to determine which, if any, tamper-events have occurred so that RTC 250 can record the timestamp for such tamper-event(s), and so that a timestamp flag can be set, if desired. Optionally, an interrupt can be generated on an interrupt pin 262 that is connected to a processor 260 such as an MCU. Optionally, the processor can then implement a desired responsive command.

Figure 3:
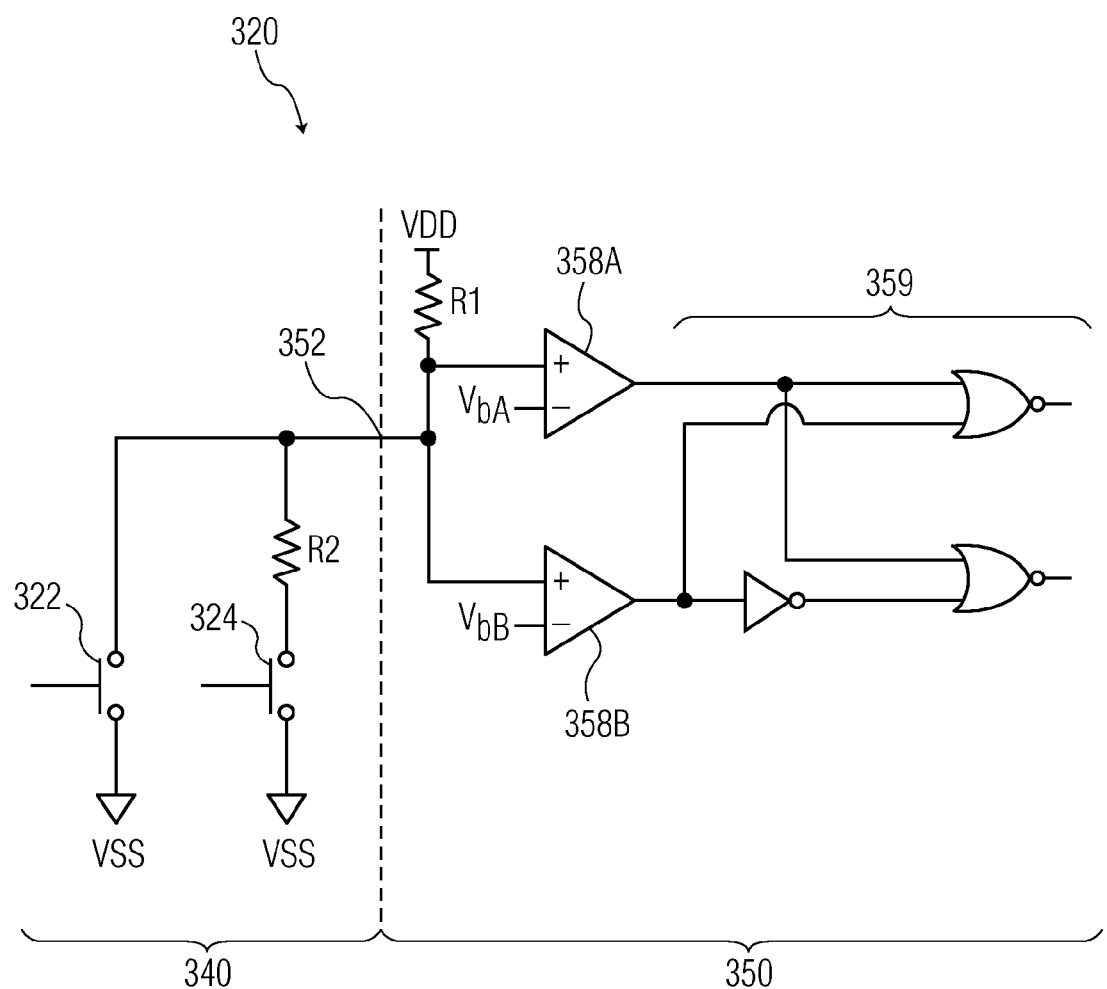
FIG. 3 is a circuit arrangement according to an embodiment of the present disclosure.

FIG. 3 shows a circuit diagram of an embodiment of the present disclosure. Multiple event detection circuit 320 includes a signal integration portion 340 and a RTC portion 350 that includes multiple-level detection circuitry. The signal integration portion 340 includes a first-cover switch 322 and a second-cover switch 324, each connected to ground (VSS) on one end. The signal of the second-cover switch 324 is modulated by a resistor R2. The signals from both the first-cover switch 322 and the second-cover switch 324 are integrated as a single input into RTC 350 at input pin 352.

Input 352 of RTC 350 is connected to voltage VDD through pull-up resistor R1. When first-cover switch 322 is closed, the event generates a VSS level in the input pin, and when second-cover switch 324 is closed, the event generates an intermediate voltage level equal to [R2/(R1+R2)]*VDD. The values of R1 and R2 can be selected so that the circuitry onboard the RTC can distinguish the different signal levels and set different flags for each event. For example, if R1 and R2 are equal (e.g., each resistor being 200 kOhm), the intermediate level is VDD/2. This provides sufficient separation between the highest level (VDD) and the lowest level (VSS) to resolve the various signal levels.

Referring back to FIG. 3, the multiple-level detector circuit includes a first comparator 358A that can be biased to a level $V_{bA}$ that is higher than [R2/(R1+R2)]*VDD (or higher than VDD/2 when R1=R2). In this way, comparator 358A can detect an event at either or both of the cover switches 322 and 324. The multiple-level detector circuit also includes a second comparator 358B that can be biased to a level $V_{bB}$ that is lower than [R2/(R1+R2)]*VDD (or lower than VDD/2 when R1=R2), thereby detecting only events at first-cover switch 322. The comparator outputs can then be processed by logic circuit 359 having two outputs, one of which can be used to generate a flag when the first-cover switch indicates a tamper-event, the other of which can be used to generate a flag when the second-cover switch indicates a tamper-event. Those of skill in the art will appreciate that circuits and methods of the present disclosure, such as exemplified in FIG. 3, can also be used to distinguish from among more than two event-signals.

Any suitable method of modulating the event signals can be used to create multiple signal levels in the composite signal to allow the multiple-event detection circuit of the RTC to distinguish among events even though a single input pin is used. In the embodiment of FIG. 3, resistors were selected to create voltage levels of VDD, VDD/2, and VSS. In other embodiments, one or more capacitors can be used to modulate one or more of the event signals. By using capacitors, each event signal can be produced by a different R-C circuit having distinct time constants. The different events can then be distinguished based on the slope of the detected signal edge. In still other embodiments that utilize push-buttons as the event switches, different push-button de-bouncing characteristics can be used to distinguish among events. For example, the de-bouncing periods or frequencies can be selected so that the signals can be distinguished. Selection might simply involve using a high-grade push-button switch and a low-grade push-button switch, thereby providing sufficient differentiation. Other suitable methods of distinguishing the signals will be appreciated by those of skill in the art based on the present disclosure. In addition, those of skill in the art will appreciate that more than two event signals can be integrated and distinguished.

By way of summary, the various steps that can be performed using methods and circuitry according to the present disclosure include the following. The event-signals associated with at least two different events are distinguished by modulating one of the event-signals relative to the other. The event-signals are coupled into the same input port of a RTC as a composite signal that can have different signal levels (or other signal characteristics) based on the states of the event switches. A multiple input-level detection circuit on the RTC is then used to distinguish from among the various possible signal levels, thereby distinguishing signals associated with one event from signals associated with another event. If an event-signal is detected, the event type can be flagged and a timestamp recorded. In the absence of any event-signal, continuous monitoring proceeds.

What is claimed is:

1. A multiple-event detection circuit, comprising:
a real time clock (RTC) integrated-circuit chip with an input port to receive an input signal indicative of an event, and with a multiple input-level detection circuit;
a first-event switch;
a second-event switch; and
an interface circuit to couple a first-event signal from the first-event switch to the input port and to couple a second-event signal from the second-event switch to the input port, the multiple input-level detection circuit to distinguish the first-event signal from the second-event signal based upon a slope of at least one of the signals, and the RTC integrated-circuit chip to record a first timestamp for and in response to the first-event signal and to record a second timestamp for and in response to the second-event signal.

2. The circuit of claim 1, further comprising a housing to enclose the multiple-event detection circuit, wherein the first-event switch is used to indicate that the housing has been opened.

3. The circuit of claim 1, further comprising a housing to enclose the multiple-event detection circuit, wherein the first-event switch is used to indicate that the circuit has been exposed.

4. The circuit of claim 1, further comprising a housing, with a first and a second cover, to enclose the multiple-event detection circuit, wherein the first-event signal indicates that the first cover has been opened and wherein the second-event signal indicates that the second cover has been opened.

5. The circuit of claim 1, further including at least one capacitor configured and arranged to modulate at least one of the event signals to produce one of the event signals with a time constant that is different than a time constant of another one of the event signals, and wherein the multiple input-level detection circuit distinguishes the first-event signal from the second-event signal based on the different time constant.

6. The circuit of claim 1, wherein the first-event switch and second-event switch are push-button switches.

7. The circuit of claim 6, wherein the multiple input-level detection circuit distinguishes the first-event signal from the second-event signal by differences in at least one of push-button switch de-bouncing times and frequencies.

8. The circuit of claim 1, wherein the multiple input-level detection circuit distinguishes the first-event signal from the second-event signal by respective signal edge characteristics of the first and second signals as presented within a composite signal.

9. The circuit of claim 1, wherein the first-event signal and the second-event signal indicate different tamper attempts.

10. The circuit of claim 1, wherein the first-event switch and second-event switch are powered by a same source voltage, and the interface circuit couples the second-event signal through a signal modulator.

11. The circuit of claim 10, wherein the signal modulator is a resistor.

12. The circuit of claim 10, wherein the signal modulator is a capacitor.

13. The circuit of claim 1, wherein the multiple input-level detection circuit includes a first comparator biased to detect at least one of the first-event signal and the second-event signal, and a second comparator biased to detect only the first-event signal.

14. A method for distinguishing and timestamping multiple events comprising:
modulating a first-event signal indicative of a first-event relative to a second-event signal indicative of a second-event;
coupling the first-event signal and second-event signal into an input port of a real time clock (RTC) integrated-circuit chip that includes a multiple input-level detection circuit;
distinguishing the first-event signal from the second-event signal based upon a slope of one of the signals using the multiple input-level detection circuit; and
recording a first timestamp for and in response to the first-event signal and a second timestamp for and in response to the second-event signal.

15. The method of claim 14, wherein the recording step further comprises generating an interrupt on an interrupt port of the real time clock (RTC) integrated-circuit chip.

16. The method of claim 14, wherein modulating the first-event signal relative to the second-event signal comprises modulating a voltage level.

17. The method of claim 14, wherein the first-event includes engaging a first push-button switch, and the second-event includes engaging a second push-button switch.

18. The method of claim 17, wherein the modulating the first-event signal relative to the second-event signal further comprises selecting the first push-button switch to have different de-bouncing characteristics than the second push-button switch.

19. The method of claim 14, wherein modulating the first-event signal relative to the second-event signal further comprises modulating a signal edge characteristic.

20. An electronic device comprising:
a housing comprising a first cover and a second cover; and
a tamper-event detection circuit, comprising:
a first tamper-event switch associated with the first cover to produce a first tamper-signal indicative of tampering with the first cover;
a second tamper-event switch associated with the second cover and to produce a second tamper-signal indicative of tampering with the second cover;
a real time clock (RTC) integrated-circuit chip having an input port coupled to a multiple input-level detection circuit; and
an interface circuit to couple the first tamper-signal and the second tamper-signal to the input port, the multiple input-level detection circuit to distinguish the first tamper-signal from the second tamper-signal based upon a slope characteristic of at least one of the signals, and the RTC integrated-circuit chip to record a first timestamp for and in response to the first tamper-signal and to record a second timestamp for and in response to the second tamper-signal.

21. The device of claim 20, wherein the device is a mobile electronic device.

22. The device of claim 21, further comprising a battery cover corresponding to the first cover and a display corresponding to the second cover.

23. The device of claim 20, wherein the device further comprises a CPU.

* * * * *